Nov. 6, 1956   R. KNAUS   2,769,845
PRODUCTION OF OLEFIN CHLOROHYDRINS
Filed April 16, 1953
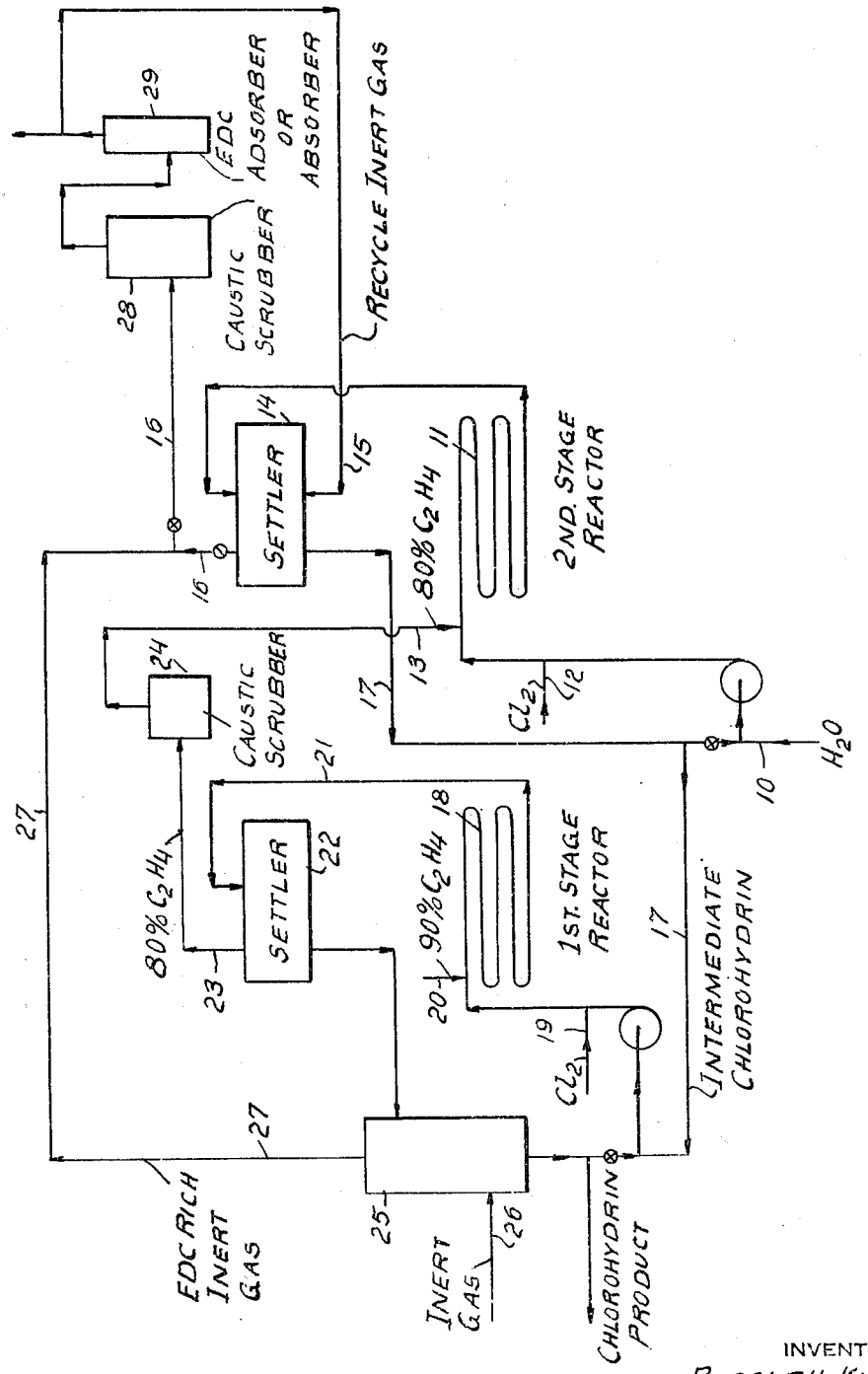
INVENTOR
RUDOLPH KNAUS
BY
Adams, Forward and McLean
ATTORNEYS

United States Patent Office 2,769,845
Patented Nov. 6, 1956

2,769,845

PRODUCTION OF OLEFIN CHLOROHYDRINS

Rudolph Knaus, Niagara Falls, N. Y., assignor to Olin Mathieson Chemical Corporation, a corporation of Virginia Application April 16, 1953, Serial No. 349,177

4 Claims. (Cl. 260—634)

This invention relates to the production of olefin chlorohydrins such as ethylene chlorohydrin, propylene chlorohydrin or mixtures thereof from olefin rich gases by aqueous chlorohydrination.

Processes of producing ethylene, and other chlorohydrins, usually consist in introducing a stream of ethylene-bearing gas and a stream of chlorine into a body of dilute aqueous hypochlorous acid introduced as such or produced by the reaction of water with chlorine in the reactor. In general, according to these processes, the stream of ethylene is diluted with saturated hydrocarbons such as methane and ethane or other inert gases, the mixed gas containing up to about 30 to 40 mole percent of ethylene. A suitable proportion of chlorine is introduced to react with the ethylene contained in the hydrocarbon gas with the production of an ethylene chlorohydrin solution of about 6% concentration. Extensive operations of distillation or extraction are necessary in order to obtain relatively concentrated solutions of ethylene chlorohydrin or pure anhydrous ethylene chlorohydrin. Ethylene dichloride is always formed in the reaction mixture as a by-product.

Whenever an attempt has been made to use a relatively concentrated ethylene gas containing for example 50 mole percent or more of ethylene or to reduce the proportion of water introduced or to recycle the aqueous liquor in an effort to obtain ethylene chlorohydrin solutions of greater concentration, numerous difficulties are encountered. The proportion of ethylene dichloride formed usually increases and its presence appears to favor the formation of additional quantities.

An object of my invention is to permit the manufacture of relatively concentrated chlorohydrin solutions up to 12% or more using rich ethylene gas as feed. Yields are 80% or more and conversions are high. The formation of ethylene dichloride is controlled by conducting the process as a multi-stage process and scrubbing ethylene dichloride from the reaction liquor by means of an inert gas stream between stages.

According to my invention, chlorine is dissolved in a flowing stream of recycle liquor and fresh water. The ethylene stream from a first stage operation is introduced with the liquor and passed through a second stage reactor. The reactors are preferably tubular in character, and the gases dissolve and react in the flowing stream of water. A temperature within the range of about 0° to 85° C. may be used but it is preferable to maintain the temperature of the reaction mixture at about 50° to 60° C. The reaction mixture from the second, or last, stage reactor advantageously is introduced into a settler or contact tower where ethylene dichloride is removed. Small amounts may separate as a heavy liquid phase and be removed as such. An inert gas stream, preferably recycled inert gas from which ethylene dichloride has been scrubbed, is brought into intimate contact with the reaction liquor at a pressure of from just above atmospheric up to about 75 p. s. i. g. Ethylene dichloride is scrubbed from the liquor and passes to an ethylene dichloride recovery system. The reaction liquor is pumped to the first stage reactor although part may be recycled to the second stage reactor. Concentrated ethylene and additional chlorine are admixed therewith and the mixture is passed through a tubular first stage reactor. Unreacted bas is separated in a gas-liquid separation zone and is charged to the second stage reactor. The interstage reaction liquor advantageously is scrubbed with an inert gas as by flowing it downward through a scrubber tower. Ethylene dichloride is scrubbed from the downwardly descending liquor by countercurrent contact with the inert gas. Ethylene dichloride advantageously is recovered from the inert gas which then can be recycled or vented.

The ethylene dichloride recovery system on the gas side may comprise a caustic scrubber to remove acidic gases and an ethylene dichloride separator. The ethylene dichloroide may be removed from the gas stream by refrigeration or by absorption or adsorption. Thus ethylene dichloride may be removed by absorption in a suitable oil from which it is recovered by heating, or it may be adsorbed by activated carbon or other adsorbent means. The gas freed of ethylene dichloride may be partially utilized as recycle while the excess is vented.

By this means ethylene dichloride formed in the second stage reactor is removed from the liquor before it is charged to the first stage reactor. The rich ethylene thus reacts with hypochlorous acid substantially in the absence of ethylene dichloride. As a result, substantially all of the chlorine introduced is converted to ethylene chlorohydrin and the proportion of ethylene dichloride formed is considerably reduced.

The accompanying drawing illustrates one application of the process by means of a diagrammatic flow plan. Water is pumped through line 10 to a second stage reactor 11. Chlorine is introduced through connection 12 and downstream partially reacted ethylene (which may contain perhaps about 80% $C_2H_4$) from the first stage is introduced through line 13. The stream containing dissolved and undissolved gases passes through the tubular reactor which is maintained at a suitable reaction temperature and thence into a settler 14. Ethylene dichloride may occasionally form a separate liquid phase which may be removed from the bottom of the settler by means of a valved line (not shown). No ethylene dichloride forms as a separate phase in normal operation. As shown, recycled inert gas from the ethylene dichloride recovery system is introduced by means of line 15 into the settler and the effluent gases return to the ethylene dichloride recovery system by overhead line 16. The reaction liquor substantially freed of ethylene dichloride and containing about 3–5% of ethylene chlorohydrin is pumped through line 17 to the first stage reactor 18. Chlorine and fresh ethylene feed (90+% $C_2H_4$) are introduced by connections 19 and 20 respectively. The tubular first stage reactor 18 is similar to the second stage reactor 11. The reaction effluent is substantially free of hypochlorous acid and now contains about 8–12% of ethylene chlorohydrin. It is passed by line 21 to a settler or gas separator 22 where unreacted ethylene is separated by overhead line 23. The effluent gas containing about 80% ethylene passes through a caustic scrubber 24 to neutralize acidic gases and then to the second stage reactor. The liquor from the first stage settler 22 is passed to a scrubbing tower 25 where it may be contacted with the fresh inert gas introduced by line 26 in order to substantially remove ethylene dichloride from the product ethylene chlorohydrin solution. A portion of the first stage reactor effluent may be recycled to the second stage reactor in order to maintain the concentration of the product at a desired concentration. The contact zones are sized to give about ½ minute to several minutes contact time. Although fresh inert gas has been shown for treating the product solution, with a gas treating and recycle system utilized in connection with the second stage reaction liquor, the procedure may be reversed and other treating arrangements may be employed. The inert scrubbing gas advantageously comprises a substantially olefin free hydrocarbon gas stream. Internal devices in the gas-liquid contact zones advantageously are employed to promote efficiency of contact. Satisfactory materials of construction for equipment for practicing the process are "Karbate", glass, chemical stoneware or phenol-formaldehyde-asbestos compositions sold under the trade name "Haveg".

The scrubbing gas stream is passed by lines 27 and 16 to the ethylene dichloride recovery system. In the recovery system, acidic components are scrubbed from the gas stream in caustic scrubber 28 and ethylene dichloride is removed by adsorption or absorption with appropriate contact means, or by straight refrigeration in tower 29.

In the chlorohydrination process, it is desirable to control reactor pressure from about 10 to about 100 p. s. i. g. Using a tubular reactor, the tube diameter may vary from about 1.5 to 4 inches in diameter. Although larger tubes can be used, they are more expensive than is usually justifiable. A suitable velocity of flow of the reaction liquor in the tubes is about 3 to 7 feet per second. The feed gas may contain from about 50 to 95 mole percent of ethylene. Reactor temperatures may vary from about 25 to 80° C. A minimum of two reaction stages should be used.

I claim:

1. In the production of olefin chlorohydrins by chlorohydrination of an olefin rich gas with dilute aqueous hypochlorous acid formed from the reaction of chlorine and water, the method which comprises conducting the chlorohydrination reaction in a plurality of serially connected gas-liquid reaction stages wherein the olefin rich gas and liquid flow countercurrently between the stages, separating gas and reaction liquor between stages and scrubbing the reaction liquor with an inert gas stream to remove ethylene dichloride.

2. The method of claim 1 wherein the olefin is ethylene.

3. In the production of olefin chlorohydrins by chlorohydrination of an olefin rich gas with dilute aqueous hypochlorous acid formed from the reaction of chlorine and water, the method which comprises conducting the chlorohydrination reaction in a plurality of serially connected gas-liquid reaction stages wherein the olefin rich gas and liquid flow countercurrently between the stages, separating gas and reaction liquor at the end of each reaction stage, scrubbing the reaction liquor from the last stage with an inert gas stream to remove ethylene dichloride, contacting the effluent gas stream from the scrubbing operation with caustic soda, separating ethylene dichloride from the caustic scrubbed gas, scrubbing separated interstage reaction liquor with said gas to remove ethylene dichloride and charging the scrubbed reaction liquor to the preceding reaction stage.

4. The method of claim 3 in which inert gas separated from the interstage reaction liquor is mixed with the inert scrubbing gas recovered from the scrubbing of the reaction liquor from the last stage and the mixture is recycled through the caustic scrubbing and ethylene dichloride separating operations and used as the scrubbing medium in the last stage reaction liquor scrubbing operation.

References Cited in the file of this patent

UNITED STATES PATENTS

| | | |
|---|---|---|
| 2,167,203 | Guinot | July 25, 1939 |
| 2,265,793 | Archibald | Dec. 9, 1941 |
| 2,566,355 | Neuhaus | Sept. 4, 1951 |